United States Patent
Hu et al.

(10) Patent No.: US 7,012,780 B1
(45) Date of Patent: Mar. 14, 2006

(54) DISK DRIVE AND METHODS THAT CALIBRATE MICRO ACTUATOR POSITIONING BEFORE SEEK OPERATIONS

(75) Inventors: Xiaoping Hu, Milpitas, CA (US); Yu Sun, Fremont, CA (US); Lin Guo, Saratoga, CA (US); Donald Brunett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/070,783

(22) Filed: Mar. 2, 2005

Related U.S. Application Data

(60) Provisional application No. 60/606,867, filed on Sep. 2, 2004.

(51) Int. Cl.
   *G11B 5/596* (2006.01)
(52) U.S. Cl. ............... 360/78.05; 360/77.02; 369/47.55; 369/30.15
(58) Field of Classification Search ........ None
   See application file for complete search history.

(56) References Cited

U.S. PATENT DOCUMENTS

| | | | |
|---|---|---|---|
| 4,907,109 A * | 3/1990 | Senio | 360/78.04 |
| 6,707,633 B1 | 3/2004 | Okuyama et al. | 360/75 |
| 6,747,836 B1 * | 6/2004 | Stevens et al. | 360/78.05 |

* cited by examiner

*Primary Examiner*—Andrew L. Sniezek
(74) *Attorney, Agent, or Firm*—Myers Bigel Sibley & Sajovec, PA

(57) ABSTRACT

A disk drive includes a data storage disk, a transducer, a micro actuator, a coarse actuator, and a controller. The micro actuator is configured to position the transducer relative to the disk over a first range of movement. The coarse actuator is configured to position the micro actuator relative to the disk over a second range of movement that is larger than the first range of movement. The controller is configured to control positioning of the transducer by the coarse actuator and the micro actuator in a track following operation, and in a seek operation responsive to a seek command. The controller is also configured to calibrate its positioning of the transducer by the micro actuator responsive to receipt of the seek command and prior to seeking the transducer from an initial track to a target track.

22 Claims, 5 Drawing Sheets

DISK DRIVE AND METHODS THAT CALIBRATE MICRO ACTUATOR POSITIONING BEFORE SEEK OPERATIONS

RELATED APPLICATION

This application claims the benefit of and priority to U.S. Provisional Patent Application Ser. No. 60/606,867, filed Sep. 2, 2004, the disclosure of which is hereby incorporated herein by reference as if set forth in its entirety.

FIELD OF THE INVENTION

The present invention relates to disk drives and, more particularly, to a disk drive and associated methods that use a coarse actuator and a micro actuator to position a transducer relative to a disk in the disk drive.

BACKGROUND OF THE INVENTION

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks. The disk is rotated by a spindle motor at a high speed, allowing the transducer to access different sectors within each track on the disk.

The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position. In general, the seek function is initiated when a host computer associated with the computer disk drive issues a seek command to read data from or write data to a target track on the disk.

As the transducer approaches the target track, the servo control system initiates a settle mode to bring the transducer to rest over the target track within a selected settle threshold, such as a percentage of the track width from track center. Thereafter, the servo control system enters the track following mode wherein the transducer is maintained at a desired position with respect to the target track (e.g., over a centerline of the track) until desired data transfers are complete and another seek is performed.

The ability to precisely position a transducer with respect to a track being followed has become increasingly important, as data and track densities in disk drives have increased. In particular, the space between adjacent tracks has become increasingly small, and the tracks themselves have become increasingly narrow. In order to increase the precision with which a transducer may be positioned with respect to a track during track following, an articulated actuator arm may be used. In general, the angle of the distal portion, or second stage, of the actuator arm with respect to the main portion, or first stage, of the actuator arm is controlled by a micro actuator. By operating the micro actuator to introduce small changes in the position of the transducer with respect to a track being followed, the accuracy of track following operations may be increased.

Because the location of the transducer is a combination of the contributions of the coarse actuator and the micro actuator, the position of the micro actuator within its relatively small range of motion typically isn't directly observable. Instead, the current position and response of the micro actuator to movement commands is usually estimated through a model of the micro actuator. Accordingly, the accuracy of the estimated response of the micro actuator to movement commands can substantially affect the precision with which the transducer can be positioned relative to a track.

SUMMARY OF THE INVENTION

Some embodiments of the present invention provide a disk drive and associated methods of controlling positioning of a transducer therein. The disk drive includes a data storage disk, a transducer, a micro actuator, a coarse actuator, and a controller. The transducer is configured to read data from the disk. The micro actuator is configured to position the transducer relative to the disk over a first range of movement. The coarse actuator is configured to position the micro actuator relative to the disk over a second range of movement that is larger than the first range of movement. The controller is configured to control positioning of the transducer by the coarse actuator and the micro actuator in a track following operation and in a seek operation. The controller is also configured to calibrate its positioning of the transducer by the micro actuator in response to receipt of a seek command and prior to seeking the transducer from an initial track to a target track.

In some further embodiments of the present invention, the controller may be configured to determine seek parameters that are used for seeking the transducer from the initial track to the target track and for following the target track. The controller may also be configured to carry out the calibration of the positioning of the transducer by the micro actuator during at least a portion of time while the seek parameters are determined. The controller may be configured to measure a response of the micro actuator to a movement command, and to calibrate its positioning of the transducer by the micro actuator based on the measured response.

Accordingly, the response of the micro actuator can be determined while the disk drive prepares for a seek operation, and the control of the micro actuator can be calibrated therefrom. Such calibration may cause the micro actuator to be controlled more accurately, and may be performed without significantly reducing the bandwidth or responsiveness of the disk drive to read/write and/or seek commands.

In yet some further embodiments of the present invention, the controller may calibrate its positioning of the transducer by the micro actuator by initially positioning the transducer at a predetermined radial location along the initial track. The controller may then provide a command pulse to the micro actuator to cause an abrupt radial movement of the transducer away from the predetermined radial location. The controller can then measure a change in radial location of the transducer relative to the predetermined radial location, and determine the response of the micro actuator to the command pulse based on the measured change in radial location of the transducer.

A position error signal may be generated that is based on a read signal from the transducer. The controller may measure a change in radial location of the transducer by measuring a change in the position error signal that is caused by movement of the transducer away from the predetermined radial location along the initial track in response to the command pulse. The controller may be configured to provide the command pulse to the micro actuator to extend the micro actuator and move the transducer away from the predetermined radial location for the calibration, and to then retract the micro actuator to about a median location within the first range of movement while seeking the transducer from the initial track to the target track.

In yet some further embodiments of the present invention, the controller may control positioning of the micro actuator during a track following operation based on a micro actuator control loop that has a variable gain. The controller can vary the gain of the micro actuator control loop based on the measured response of the micro actuator to the movement command. The controller may determine a gain $K_i$ of the micro actuator control loop from the measured response of the micro actuator by a present instance of the calibration, and vary the gain of the micro actuator control loop based on the following equation:

$$K = W_0 * K_0 + W_i * K_i,$$

where K is the gain of the micro actuator control loop that is used to control positioning of the transducer by the micro actuator, $K_0$ is a gain of the micro actuator control loop before the present instance of the calibration, $K_i$ is the determined gain of the micro actuator control loop from the present instance of the calibration, and $W_0$ and $W_i$ are weighting coefficients.

In yet some further embodiments of the present invention, the controller may repetitively calibrate its positioning of the transducer by the micro actuator before separate ones of a plurality of different seek operations. The controller may be configure to selectively perform the calibration before seek operations based on a radial distance that the transducer is to be moved between tracks. The controller may be configured to measure a response of the micro actuator to a movement command that moves the transducer in a first radial direction before some of the seek operations, and measure a response of the micro actuator to a movement command that moves the transducer in a second radial direction, which is opposite to the first radial direction, before some other of the seek operations.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of disk drives and methods according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
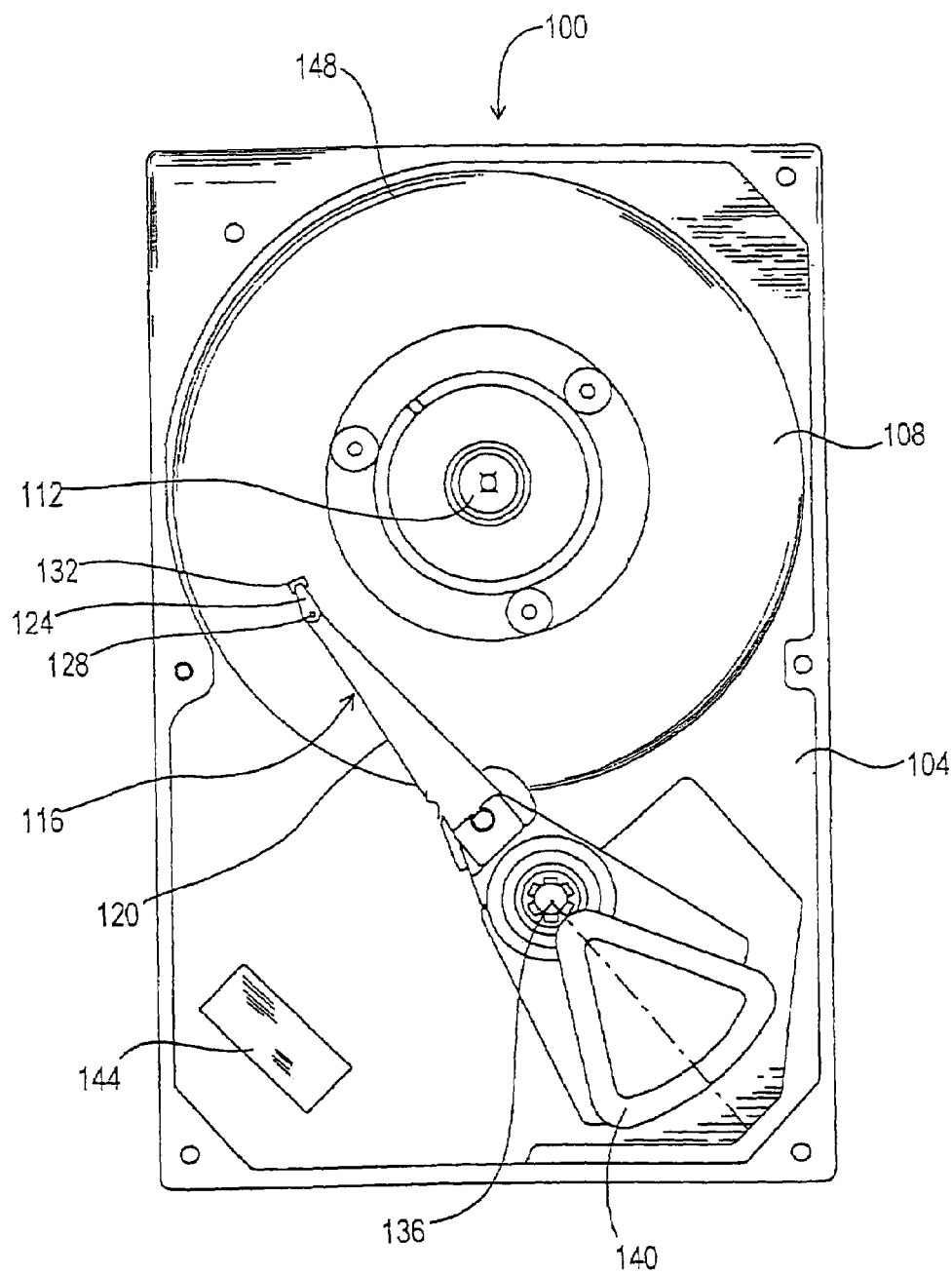
FIG. 1 is a block diagram of a disk drive including a controller that is configured to control positioning of a transducer by a coarse actuator and a micro actuator in accordance with some embodiments of the present invention.

FIG. 1 illustrates a computer disk drive with a dual stage actuator. The disk drive, generally identified by reference number 100, includes a base 104 and one or more data storage disks 108 (only one of which is shown in FIG. 1). The disk 108 may be a magnetic disk, an optical disk, or any other type of data storage disk, and may have data storage tracks defined on one or both of its storage surfaces. The disk 108 is interconnected to the base 104 by a spindle motor (not shown) mounted within or beneath the hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a micro actuator 128. A transducer 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. Although only one actuator arm assembly 116 is shown in FIG. 1, it is to be understood that a plurality of the actuator arm assemblies 116 may be interconnected and configured to position a transducer adjacent to each respective data storage surface of a stack of the disks 108.

The first member 120 of the actuator arm assembly 116 can be interconnected to the base 104 by a bearing 136. A coarse actuator 140 can pivot the actuator arm assembly 116 about the bearing 136 to position the micro actuator 128 and, thereby, position the transducer 132 with respect to the disk 108. In particular, the coarse actuator 140 positions the transducer 132 to allow it to access different data tracks or cylinders 148 on the disk 108. The coarse actuator 140 is configured to position the micro actuator 128 and, thereby, the transducer 132 over a range of movement that may correspond to the distance between an inner and outer data storage track of the storage surface of the disk 108. The coarse actuator 140 may be, for example, a motor, such as a VCM.

The articulation of the second member 124 with respect to the first member 120 of the actuator arm assembly 116 may be achieved by, for example, providing a journal bearing as part of the micro actuator 128, by providing a flexible interconnection between the second member 124 and the first member 120, or by otherwise joining the second member 124 to the first member 120 in such a way that the second member 124 is allowed to move with respect to the first member 120.

The micro actuator 128 is configured to position the transducer 132 relative to the disk 108 over a range of movement that is less than the range of movement provided by the coarse actuator 140. The micro actuator 128 may affect finer positioning and/or higher frequency movements of the transducer 132 within its range of movement (e.g., over relatively short distances), such as that which may be encountered during short seeks (e.g., a few tracks) or during track following. The micro actuator 128 may be any mechanism capable of moving the transducer 132 relative to the disk 108, such as by adjusting the second member 124 of the actuator arm assembly 116 with respect to the first member 120. For example, the micro actuator 128 may be a piezoelectric actuator, an electromagnetic actuator, or an electrostatic actuator. Accordingly, the micro actuator 128 may move the transducer 132 faster across the disk 108, within its range of movement, than may be possible with the coarse actuator 140. In another embodiment, the second member 124 may be eliminated by directly connecting the transducer 132 to a surface or extension of the micro actuator 128.

A controller 144 is configured to control positioning of the transducer 132 by the coarse actuator 140 and the micro actuator 128. When reading/writing data on the disk 108, the controller 144 can control the coarse actuator 140 and the micro actuator 128 to position and maintain the transducer 132 at a desired radial location along a track on the disk 108 (i.e., track following). The disk drive 100 can receive a seek command, such as from a host device, to seek the transducer 132 from an initial track to a target track on the disk 108 where data is to be read/written. In response to the seek command, the controller 108 determines seek parameters that will be used to seek the transducer 132 between the tracks and/or to follow the target track. The seek parameters that can be determined during seek preparation may include, but are limited to, a current profile (i.e., profile of actuator(s) control current) and/or velocity profile (i.e., profile of transducer 132 velocity) that will be used to control positioning of the transducer 132 by the coarse actuator 140 and/or the micro actuator 128 during the seek and subsequent settling onto the target track, and/or they may include parameters that may be used by a read/write channel to read/write data onto the target track and which may vary between (be optimized for) sectors/zones of the disk.

Figure 2:
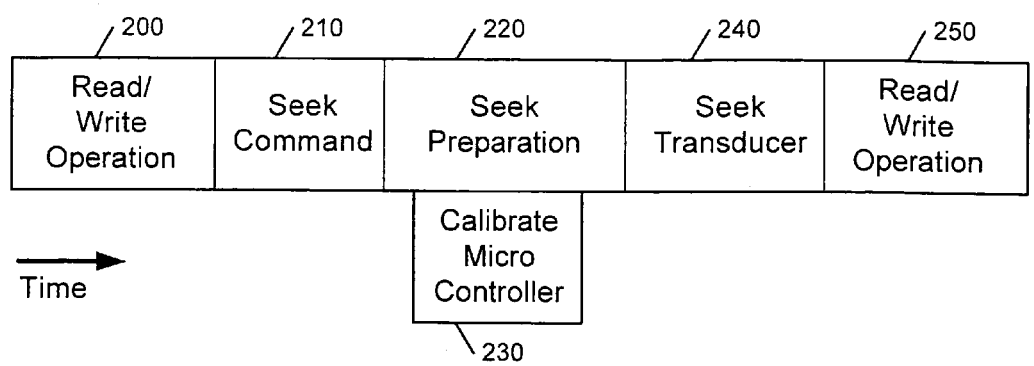
FIG. 2 is a timing diagram that illustrates typical operations in the disk drive, which provide calibration of the micro controller positioning while preparing for a seek operation in accordance with some embodiments of the present invention.

According to various embodiments of the present invention, the controller 144 is configured to calibrate its positioning of the transducer 132 by the micro actuator 128 responsive to receipt of the seek command and prior to seeking the transducer 132 from the initial track to the target track. More particularly, control of the micro actuator 128 can be calibrated while preparation is made to seek the transducer 132 between tracks. FIG. 2 is a timing diagram that illustrates typical operations in the disk drive, and which provide calibration of the micro controller positioning. These operations may be performed by the controller 144.

Referring to FIG. 2, at Block 200 read/write operations are performed while the controller 144 maintains the transducer 132 along a selected track (i.e., track following). At Block 210, a seek command is received to initiate seeking of the transducer 132 from an initial track to a target track. At Block 220, seek preparation is carried out, which can include determining seek parameters such as those described above. During at least a portion of the time while seek preparation is performed, calibration is performed at Block 230 on how the micro actuator 128 positions the transducer 132. The seek preparation (Block 220) and the micro actuator 128 calibration (Block 230) may be simultaneously performed by the controller 144 by multitasking between the corresponding operations, and/or the controller 144 may include two or more control units that perform the seek preparation and the micro actuator 128 calibration in parallel. After calibration of the micro actuator 128 positioning, the transducer 132 is moved at Block 240 to, and settles on, the target track. At Block 250, a read/write operation is carried out to read/write data on the target track.

Accordingly, the response of the micro actuator 128 can be determined while the disk drive 100 is prepared for a seek operation, and the control of the micro actuator 128 can be calibrated based on the determined response. Such calibration may cause the micro actuator 128 to be controlled more accurately, and may be performed without reducing the bandwidth or responsiveness of the disk drive 100 to read/write and/or seek commands.

The controller 144 may repetitively calibrate its positioning of the transducer by the micro actuator 128 before separate ones of different seek operations. For example, the controller 144 may selectively perform the calibration before each seek operation based on a radial distance that the transducer is to be moved between tracks by the seek.

The calibration may include measuring a response of the micro actuator 128 to a movement command, and calibrating based on the measured response. For example, in some embodiments, the transducer 132 may be positioned at a predetermined (initial) radial location along the initial track (e.g., along a centerline of the track). The controller 144 can then provide a command pulse to the micro actuator 128 to cause an abrupt radial movement of the transducer 128 away from the predetermined radial location. The controller 144 can then measure a change in radial location of the transducer 132, and can determine a response of the micro actuator 128 to the command pulse based on the measured change in radial location.

Figure 3:
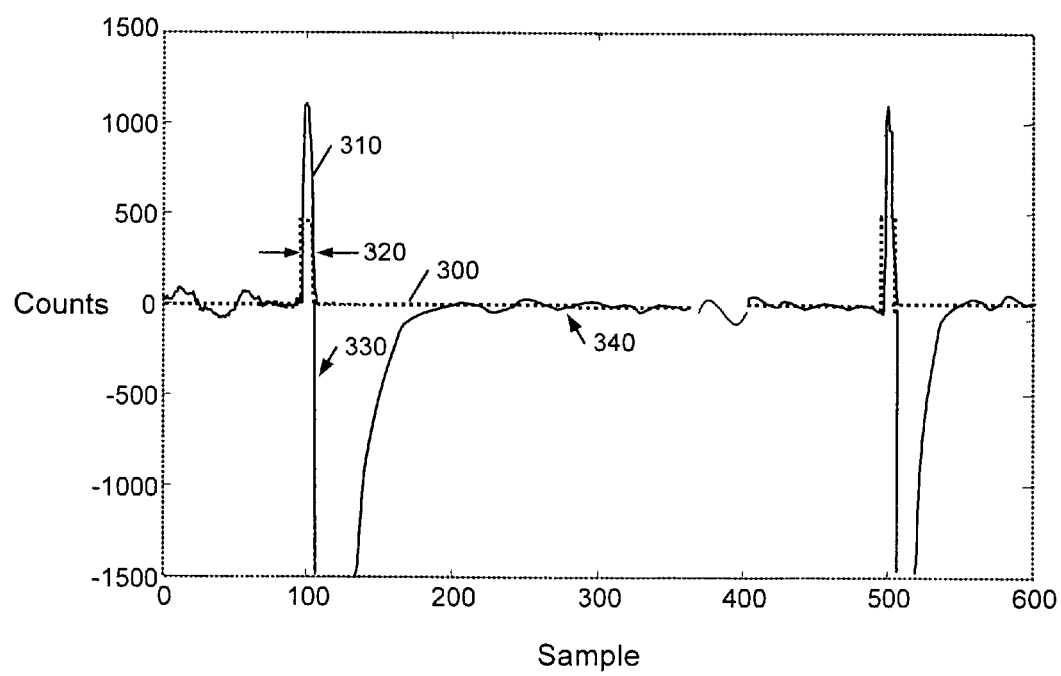
FIG. 3 is a graph illustrating results of a simulation of a calibration operation in which an illustrated command pulse is used to abruptly move the micro actuator before a seek operation in accordance with some embodiments of the present invention, and which shows the associated position error signal.

The change in radial location of the transducer 132 can be measured by measuring a change in a position error signal generated from a read signal from the transducer 132. FIG. 3 is a graph that illustrates the results of a simulation of a calibration operation in which a command pulse is used to abruptly move the micro actuator 128 before a seek operation. The x-axis represents sampled times in the simulation, and can correspond to timing associated with servo sectors, and the y-axis represents values of the command pulse that is provided to the micro actuator 128 and values of the position error signal that is generated from a read signal from the transducer 132. The command pulse values are illustrated by the dashed line 300, and the position error signal values are illustrated by the solid line 310.

Referring to FIG. 3, the transducer 132 is maintained at an initial radial position on a track (i.e., track following) from 0 to about 100 samples. At about 100 samples, the micro actuator 128 is provided the command pulse 300, which rises from about 0 to about 500, to abruptly move ("kick") the transducer 132 away from the initial radial position. Consequently, a corresponding spike is seen in the position error signal 310 from an initial value 0 to about 1200. The micro actuator 128 is then commanded back toward the initial radial position, which causes the position error signal 310 to return to its initial value 0. The width 320 of the illustrated exemplary command pulse 300 is about 3 sample times.

It may be advantageous for the width 320 of the command pulse 300 to be sufficiently brief so that substantially all of the movement of the transducer 132 can be attributed to positioning by the micro actuator 128 alone, without movement by the coarse actuator 140. Accordingly, the response of the micro actuator 128 to the command pulse 300 may be isolated from an effect of the coarse actuator 140 by using a command pulse 300 that is sufficiently brief so that can be tracked by the micro actuator 128 but not by the coarse actuator 140.

Because the time duration of the command pulse width 320 can be shorter than the seek preparation time, the response of the micro actuator 128 to the command pulse can be measured after receipt of the seek command and prior to seeking transducer 132. As shown in FIG. 3, seeking of the transducer 132 is started after the command pulse 300 returns to about 0, and which is illustrated by the position error signal 310 increasing along path 330 (in a negative direction) from about 0 to beyond −1500. After the transducer reaches and settles on the target tracks, the position error signal 310 is returns along path 340 to about 0. The response of the micro actuator 128 to another command pulse is again measured, at about the 500th sample time, before performing a subsequent seek operation.

Although the two command pulses illustrated in FIG. 3 have the same polarity, they may instead have opposite polarities. The controller 144 may measure a response of the micro actuator 128 to a command pulse that moves the transducer 132 in a first radial direction before some seek operations, and measures a response of the micro actuator 128 to an opposite polarity command pulse that moves the transducer 132 in an opposite second radial direction before some other seek operations.

When the micro actuator 128 is at about a median location within its range of movement before the command pulse, it may be returned to about the medial location (e.g., retracted) while the transducer 132 is moved by a seek operation between tracks. Accordingly, a seek operation may be carried out immediately after the response of the micro actuator 128 to the command pulse is measured, and while the micro actuator 128 is retracted.

The response of the micro actuator 128 to a movement command (e.g., a command pulse) can be measured based on how much the position error signal changes in response to a movement command. The controller 144 can control the positioning of the micro actuator during a track following operation based on a micro actuator control loop that has a variable gain. The controller 144 can then be configured to vary the gain of the micro actuator control loop based on the measured response of the micro actuator 128 to the movement command. In some embodiments, the controller 144 varies the gain of the micro actuator control loop based on the following equation:

$$K = W_0 * K_0 + W_i * K_i,$$

where K is the gain of the micro actuator control loop that is used to control positioning of the transducer 132 by the micro actuator 128, $K_0$ is a gain of the micro actuator control loop before a present instance of the calibration, $K_i$ is the determined gain of the micro actuator control loop from the present instance of the calibration, and $W_0$ and $W_i$ are weighting coefficients. The value of $K_i$ may be determined from a ratio of the measured change in the position error signal to an expected change in the position error signal. The values of the weighting coefficients $W_0$ and $W_i$ can be varied to change how quickly the micro actuator control loop tracks changes in measured response of the micro actuator 128. For example, increasing $W_i$ relative to $W_0$ can cause to micro actuator control loop more quickly track changes in the measured response of the micro actuator 128, but it may also decrease the stability of the control loop and/or increase its susceptibility to noise. The sum of $W_0$ and $W_i$ should be one.

Figure 4:
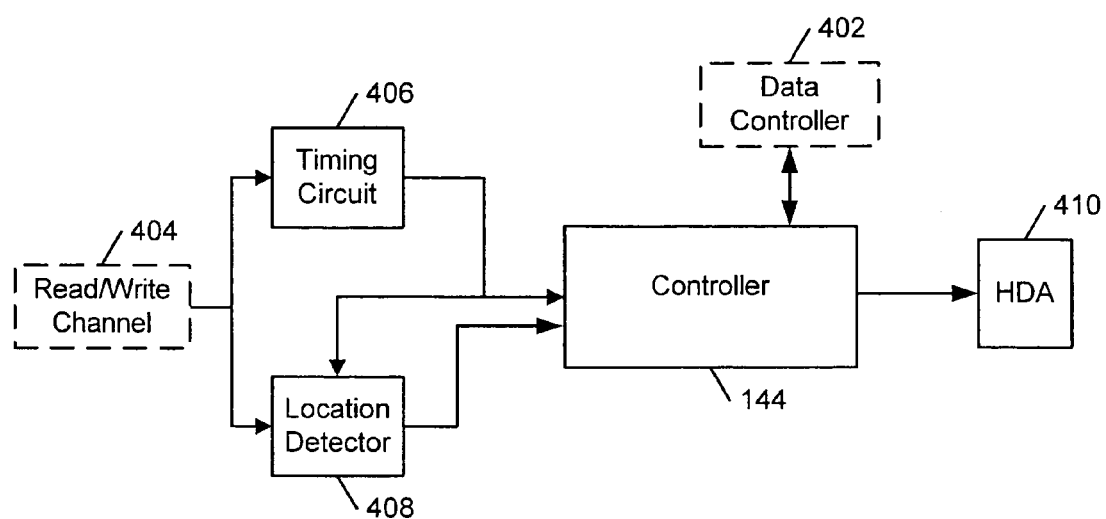
FIG. 4 is a block diagram of drive electronics of the disk drive according to some embodiments of the present invention.
Figure 5:
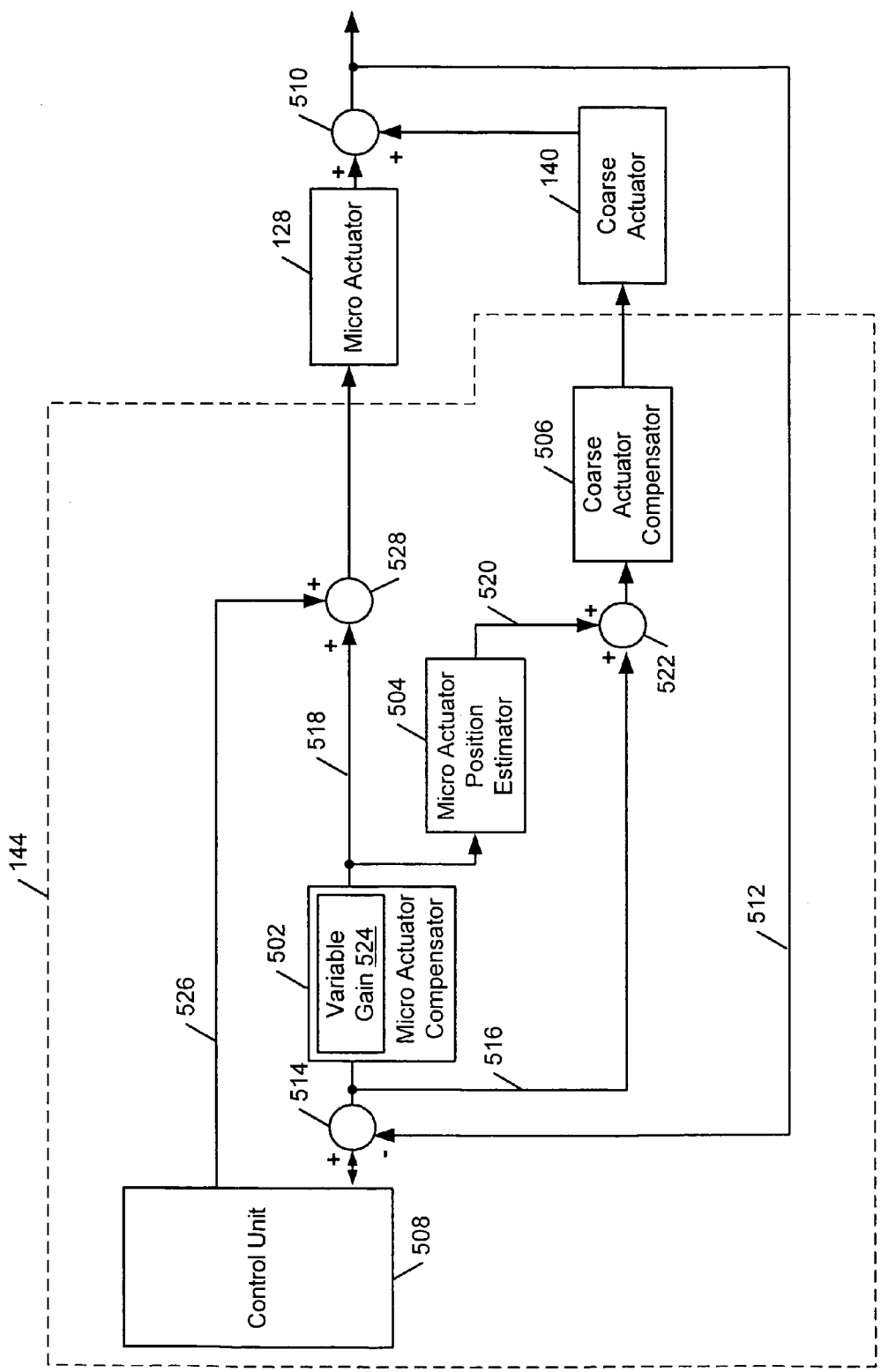
FIG. 5 is a block diagram of a controller and associated control loops of a coarse actuator and the micro actuator according to some embodiments of the present invention.

Calibration of the positioning by the micro actuator 128 and the associated micro actuator control loop will now be described with reference to FIGS. 4 and 5. FIG. 4 is a block diagram of the controller 144 along with other drive electronics of the disk drive 100, according to some embodiments of the present invention. FIG. 5 is a block diagram of a portion of the controller 144 and illustrates the associated control loops of the coarse actuator 140 and the micro actuator 128 according to some embodiments of the present invention.

With reference now to FIG. 4, the drive electronics associated with the controller 144 can include a data controller 402, a read/write channel 404, a timing circuit 406, and a location detector 408. The disk 108, coarse actuator 140, micro actuator 128, actuator arm assembly 116, and transducer 132 are collectively referred to as a hard disk assembly (HDA) 410. The data controller 402 formats data from a host device into blocks with the appropriate header information and transfers the data to a read/write channel 404.

The read/write channel 404 can operate in a conventional manner to convert data between the digital form used by the data controller 402 and the analog form used by the transducer 132. The read/write channel 404 also provides servo positional information read from the HDA 410 to the controller 144. Each servo sector of the disk 108 can include transducer location information, such as a track identification field and data block address, for identifying the track and data block, and burst fields to provide servo fine location information. The transducer location information is induced into the transducer 132, converted from analog signals to digital data in the read/write channel 404, and transferred to the controller 144. The controller 144 can use the transducer location information for performing seek and tracking operations of the transducer 132 over the disk tracks.

The timing circuit 406 can generate clock signals synchronized with the passage of servo sectors on tracks under the transducer 132. Based on the clock signals from the timing circuit 406 and the transducer location information, the location detector 408 can detect a location of the transducer 132 relative to the disk 108.

With reference now to FIG. 5, a block diagram is shown of the micro actuator and coarse actuator control loops in the controller 144. The controller 144 includes a micro actuator compensator 502, a micro actuator position estimator 504, a coarse actuator compensator 506, and a control unit 508. The controller 144 may be embodied as hardware and/or software.

The position of the transducer 132 relative to a track depends on a summation, performed at summing node 510, of the transducer positioning contributions of the micro actuator 128 and the coarse actuator 140. The controller 144 senses the position of the transducer 132 relative to a track, via the transducer 132, as a sensed position signal 512 based on, for example, servo patterns along the track. The sensed position signal 512 is fed-back to a summing node 514, where it is combined with a desired reference position signal from the control unit 508 to generate a position error signal 516. During a track following mode, the desired reference position signal from the control unit 508 may be a DC value, such as zero, to drive the transducer 132 toward a centerline of the track.

The micro actuator compensator 502 is configured to control movement of the micro actuator 128 based on the position error signal 516. For example, the micro actuator compensator 502 generates a micro actuator control signal 518 that compensates for high frequency components of the position error signal 516. The micro actuator 128 can then effect high frequency movements of the transducer 132 within its range of movement based on the control signal 518. The micro actuator position estimator 504 estimates the position of the micro actuator 128 in its range of movement and generates an estimated micro actuator position signal 520. The estimated micro actuator position signal 520 is combined at a summing node 522 with the position error signal 516 and provided to the coarse actuator compensator 506. The coarse actuator compensator 506 controls movement of the coarse actuator 140, via a coarse actuator control signal.

How the transducer 132 is positioned by the micro actuator 128 can be calibrated by adjusting a variable gain 524 in the micro actuator compensator 502. For example, the control unit 508 can generate a movement command signal 526 that is fed-forward and combined with the micro actuator control signal 518, at summing node 528, to cause the micro actuator 128 to move. The control unit 508 can then measure the response of the micro actuator 128, via the position error signal 516, and can adjust the variable gain 524 in the micro actuator compensator 502 based on the measured response and an expected response of the micro actuator 128 to the movement command. Alternatively, or additionally, the control unit 508 may adjust the micro actuator position estimator 504 based on the measured response of the micro actuator 128 as part of the calibration of the micro actuator 128.

Figure 6:
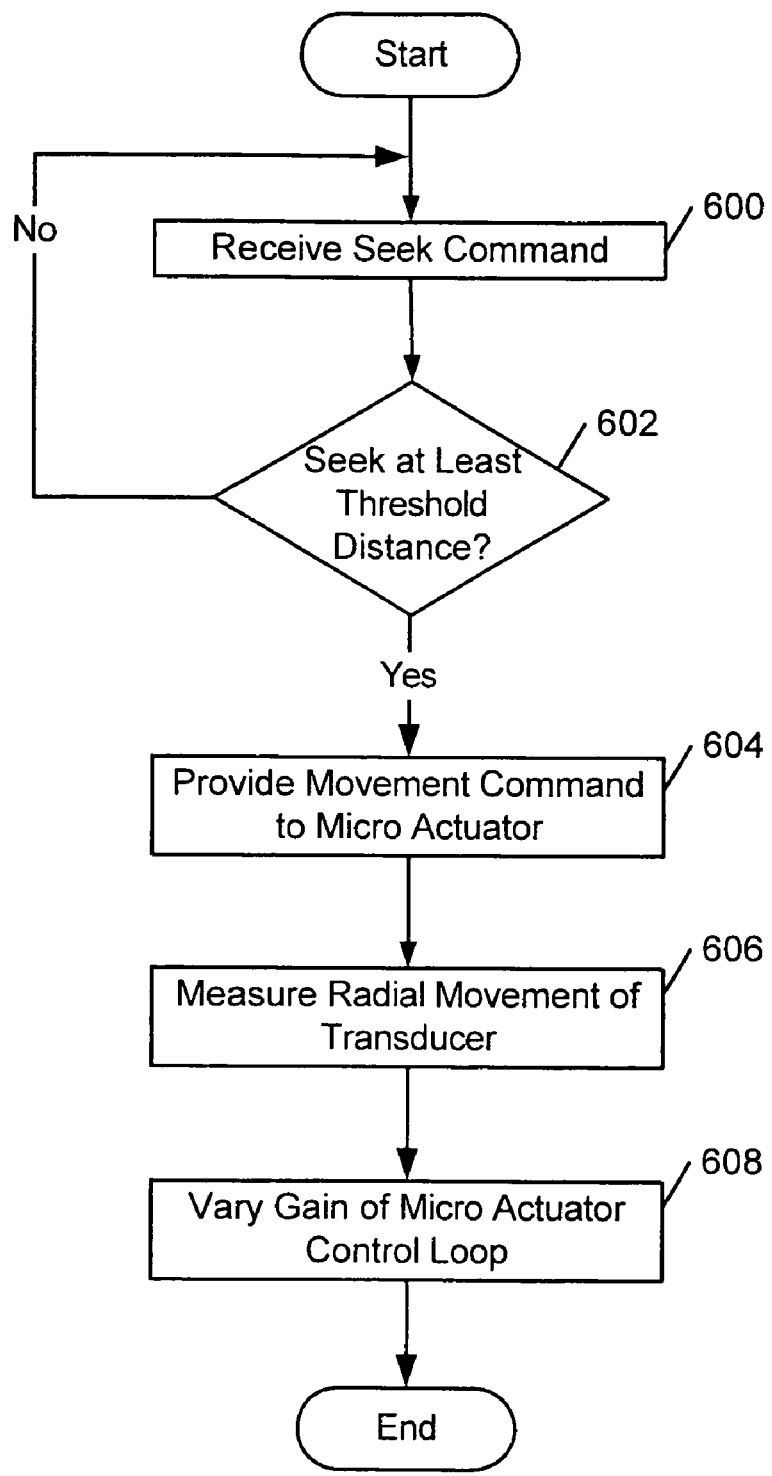
FIG. 6 is a flowchart illustrating operations for calibrating the positioning of a transducer by a coarse actuator according to some embodiments of the present invention.

Referring now to FIG. 6, a flowchart of operations is shown for calibrating the positioning of the transducer 132 by the micro actuator 128 in accordance with some embodiments of the present invention. These operations may be carried out by the controller 144. At Block 600, a seek command is received. At Block 602, a decision is made as to whether the length of the seek is at least a threshold distance. The threshold distance may be defined so that the seek preparation is sufficiently long for the calibration process to be completed without delaying initiation of seeking of the transducer 132, and/or so that the micro actuator 128 can be retracted to a nominal position while the transducer 132 is moved to the target track of the seek. At Block 604, a movement command is provided to the micro actuator 128. At Block 606, the radial movement of the micro actuator 128 is measured (e.g., via the position error signal). At Block 608, the gain (K) of the control loop of the micro actuator 128 is varied, and which may be varied in accordance with the equation $K=W_0*K_0+W_i*K_i$ as defined above.

Although the foregoing discussion has been in the context of a disk drive having two coupled actuators, the present invention is not so limited to such embodiments. Instead, the present invention may be applied to any disk drive having more than one actuator.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of controlling positioning of a transducer that is adjacent to a rotatable data storage disk in a disk drive, the disk drive having a micro actuator for positioning the transducer over a first range of movement, a coarse actuator for positioning the micro actuator over a second range of movement that is larger than the first range of movement, and a controller for controlling positioning of the transducer by the coarse actuator and by the micro actuator, the method comprising:

receiving a seek command to initiate seeking of the transducer from an initial track to a target track; and calibrating how the controller controls positioning of the transducer by the micro actuator in a track following operation, responsive to receipt of the seek command and prior to seeking the transducer from the initial track to the target track.

2. The method of claim 1, further comprising determining seek parameters that are used for seeking the transducer from the initial track to the target track and for following the target track, and wherein calibration of how the controller controls positioning of the transducer by the micro actuator is carried out during at least a portion of time while the seek parameters are determined.

3. The method of claim 1, wherein calibrating how the controller controls positioning of the transducer by the micro actuator comprises measuring a response of the micro actuator to a movement command.

4. The method of claim 3, wherein measuring a response of the micro actuator to a movement command comprises:

positioning the transducer at a predetermined radial location along the initial track;

providing a command pulse as the movement command to the micro actuator to cause an abrupt radial movement of the transducer away from the predetermined radial location along the initial track;

measuring a change in radial location of the transducer relative to the predetermined radial location along the initial track; and determining the response of the micro actuator to the command pulse based on the measured change in radial location of the transducer.

5. The method of claim 4, wherein measuring a change in radial location of the transducer comprises:

generating a position error signal based on a read signal from the transducer; and measuring a change in the position error signal caused by movement of the transducer away from the predetermined radial location along the initial track in response to the command pulse.

6. The method of claim 4, wherein providing a command pulse to the micro actuator comprises extending the micro actuator to move the transducer away from the predetermined radial location, and further comprising retracting the micro actuator to about a median location within the first range of movement while seeking the transducer from the initial track to the target track.

7. The method of claim 3, wherein the controller controls positioning of the transducer by the micro actuator during a track following operation based on a micro actuator control loop that has a variable gain, and wherein calibrating how the controller controls positioning of the transducer by the micro actuator comprises:

varying the gain of the micro actuator control loop based on the measured response of the micro actuator to the movement command.

8. The method of claim 7, wherein:

measuring the response of the micro actuator to the movement command comprises determining a gain $K_i$ of the micro actuator control loop from the measured response of the micro actuator by a present instance of the calibration; and varying the gain of the micro actuator control loop based on the measured response of the micro actuator comprises varying the gain of the micro actuator control loop based on the following equation:

$$K = W_0 * K_0 + W_i * K_i,$$

where K is the gain of the micro actuator control loop that is used to control positioning of the transducer by the micro actuator, $K_0$ is a gain of the micro actuator control loop before the present instance of the calibration, $K_i$ is the determined gain of the micro actuator control loop from the present instance of the calibration, and $W_0$ and $W_i$ are weighting coefficients.

9. The method of claim 1, further comprising repeating the calibration of how the controller controls positioning of the transducer by the micro actuator before separate ones of a plurality of different seek operations.

10. The method of claim 9, wherein calibrating how the controller controls positioning of the transducer by the micro actuator comprises:

measuring a response of the micro actuator to a movement command that moves the transducer in a first radial direction before some of the seek operations; and measuring a response of the micro actuator to a movement command that moves the transducer in a second radial direction, which is opposite to the first radial direction, before some other of the seek operations.

11. The method of claim 9, wherein calibrating how the controller controls positioning of the transducer by the micro actuator is selectively performed before seek operations based on a radial distance that the transducer is to be moved between tracks.

12. A disk drive comprising:

a data storage disk;

a transducer that is configured to read data from the disk;

a micro actuator that is configured to position the transducer relative to the disk over a first range of movement;

a coarse actuator that is configured to position the micro actuator relative to the disk over a second range of movement that is larger than the first range of movement; and a controller that is configured to control positioning of the transducer by the coarse actuator and the micro actuator in a track following operation, and in a seek operation responsive to a seek command, and is configured to calibrate its positioning of the transducer by the micro actuator responsive to receipt of the seek command and prior to seeking the transducer from an initial track to a target track.

13. The disk drive of claim 12, wherein the controller is configured to determine seek parameters that are used for seeking the transducer from the initial track to the target track and for following the target track, and is configured to carry out the calibration of positioning of the transducer by the micro actuator during at least a portion of time while the seek parameters are determined.

14. The disk drive of claim 12, wherein the controller is configured to measure a response of the micro actuator to a movement command, and is configured to calibrate its positioning of the transducer by the micro actuator based on the measured response.

15. The disk drive of claim 14, wherein the controller controls positioning of the micro actuator during a track following operation based on a micro actuator control loop that has a variable gain, and the controller is configured to vary the gain of the micro actuator control loop based on the measured response of the micro actuator to the movement command.

16. The disk drive of claim 15, wherein the controller is configured to determine a gain $K_i$ of the micro actuator control loop from the measured response of the micro actuator by a present instance of the calibration, and configured to vary the gain of the micro actuator control loop based on the following equation:

$$K = W_0 * K_0 + W_i * K_i,$$

where K is the gain of the micro actuator control loop that is used to control positioning of the transducer by the micro actuator, $K_0$ is a gain of the micro actuator control loop before the present instance of the calibration, $K_i$ is the determined gain of the micro actuator control loop from the present instance of the calibration, and $W_0$ and $W_i$ are weighting coefficients.

17. The disk drive of claim 12, wherein the controller is configured to:

position the transducer at a predetermined radial location along the initial track;

provide a command pulse to the micro actuator to cause an abrupt radial movement of the transducer away from the predetermined radial location along the initial track;

measure a change in radial location of the transducer relative to the predetermined radial location along the initial track; and determine the response of the micro actuator to the command pulse based on the measured change in radial location of the transducer.

18. The disk drive of claim 17, wherein the controller is configured to measure a change in radial location of the transducer by measuring a change in a position error signal, which is based on a read signal from the transducer, and that is caused by movement of the transducer away from the predetermined radial location along the initial track in response to the command pulse.

19. The disk drive of claim 17, wherein the controller is configured to provide the command pulse to the micro actuator to extend the micro actuator and move the transducer away from the predetermined radial location for the calibration, and to then retract the micro actuator to about a median location within the first range of movement while seeking the transducer from the initial track to the target track.

20. The disk drive of claim 12, wherein the controller is configured to repetitively calibrate its positioning of the transducer by the micro actuator before separate ones of a plurality of different seek operations.

21. The disk drive of claim 20, wherein the controller is configured to measure a response of the micro actuator to a movement command that moves the transducer in a first radial direction before some of the seek operations, and configured to measure a response of the micro actuator to a movement command that moves the transducer in a second radial direction, which is opposite to the first radial direction, before some other of the seek operations.

22. The disk drive of claim 20, wherein the controller is configured to selectively perform the calibration before seek operations based on a radial distance that the transducer is to be moved between tracks.

* * * * *